US012781548B2

(12) United States Patent
Pellegrini et al.

(10) Patent No.: US 12,781,548 B2
(45) Date of Patent: Nov. 3, 2026

(54) INTEGRATED LATERAL SEALING AND LOCKING DEVICE

(71) Applicant: Bode—Die Tür GmbH, Kassel (DE)

(72) Inventors: Andreas Pellegrini, Edermunde (DE); Lars Linnenkohl, Staufenberg (DE); Ulrich Arend, Dickershausen (DE); Chris Thöne, Kassel (DE); Diako Rasekhi Coochesfahani, Kassel (DE); Christoph Theis, Bad Wildungen (DE)

(73) Assignee: BODE - DIE TÜR GMBH, Kassel (DE)

(*) Notice: Subject to any disclaimer, the term of this patent is extended or adjusted under 35 U.S.C. 154(b) by 285 days.

(21) Appl. No.: 18/635,248

(22) Filed: Apr. 15, 2024

(65) Prior Publication Data

US 2024/0344374 A1 Oct. 17, 2024

(30) Foreign Application Priority Data

Apr. 13, 2023 (DE) ..................... 20 2023 101 876.9

(51) Int. Cl.
*E05B 83/42* (2014.01)
*B60J 10/84* (2016.01)

(52) U.S. Cl.
CPC ............... *E05B 83/42* (2013.01); *B60J 10/85* (2016.02)

(58) Field of Classification Search
CPC .................................. E05B 83/42; B60J 10/85
USPC ....................................................... 296/146.9
See application file for complete search history.

(56) References Cited

U.S. PATENT DOCUMENTS 3,934,925 A * 1/1976 Fetsch .................... B62D 31/02 292/6
4,308,691 A * 1/1982 Horn ...................... B61D 19/02 49/281
4,545,149 A * 10/1985 Jentsch .................. E05F 15/53 49/394
12,472,995 B2 * 11/2025 Rasekhi .................... E06B 7/18
2011/0154741 A1 * 6/2011 Pellegrini ............ B61D 19/008 49/501
2012/0235426 A1 * 9/2012 Pellegrini ............... E05B 85/01 292/229

(Continued)

FOREIGN PATENT DOCUMENTS

AT 406361 B 4/2000
CN 111206855 A 5/2020

(Continued)

*Primary Examiner* — Taras P Bemko
(74) *Attorney, Agent, or Firm* — CANTOR COLBURN LLP

(57) ABSTRACT

A sealing and locking device for a door leaf in a door portal includes a sealing element arranged on at least a closing edge of the door portal and of the door leaf which is fixed to the door portal. The device includes a locking unit and internally has a hinge element, which runs along the closing edge of the door portal and which can be moved in a translatory manner in the longitudinal direction. Further, the device includes a locking unit, which has a slider firmly connected to the hinge element and can be moved into a locked position, in which the slider blocks the locking component and an open position, in which the locking component can be moved unhindered in an opening direction. In a closed housing, the slider is movably mounted, the housing has a hinge passage opening and a locking component opening.

11 Claims, 6 Drawing Sheets

(56) References Cited

U.S. PATENT DOCUMENTS

| | | | | |
|---|---|---|---|---|
| 2013/0298706 | A1* | 11/2013 | Linnenkohl | E05F 15/652 74/89 |
| 2021/0131151 | A1* | 5/2021 | Vachon | E05B 83/363 |
| 2022/0106815 | A1* | 4/2022 | Stojc | E05B 81/28 |
| 2023/0039798 | A1* | 2/2023 | Theis | E05D 15/1007 |
| 2023/0287722 | A1* | 9/2023 | Pellegrini | B61D 19/02 |

FOREIGN PATENT DOCUMENTS

| | | | |
|---|---|---|---|
| EP | 1607299 | A2 | 12/2005 |
| EP | 2268526 | B1 | 8/2012 |

* cited by examiner

INTEGRATED LATERAL SEALING AND LOCKING DEVICE

CROSS-REFERENCE TO RELATED APPLICATIONS

This application claims the benefit of German patent application 20 2023 101 876.9 filed 13 Apr. 2023, the disclosure of which is incorporated herein by reference in its entirety.

TECHNICAL FIELD

The present disclosure relates to a sealing and locking device for doors of public transport vehicles, which have at least one door leaf arranged in a door portal.

BACKGROUND

Doors of public transport vehicles are generally sealed via sealing elements, which are arranged circumferentially around the door opening and/or on the edge of the door leaf. Such doors furthermore also have locking devices, which secure the door against unintentional opening in the closed locked position.

Locking means of this type are also well known. They generally have one or several locking elements, which are arranged on the door leaf and/or on the door portal and cooperate with corresponding counter elements on the door portal or on the door leaf. It is also known to electrically or pneumatically control locking devices of this type from a central control means. The locking of secondary closing edges of one- or double-leaf pivotable sliding doors thereby takes place, for example, via rotary columns, lockable pivot arms, rotary latch locks or locks. This is technically relatively simple in particular in the case of box-shaped vehicles comprising relatively straight door portals, in the case of door leaves formed in a curved manner, in contrast, however, mostly every locking device is provided with a separate controllable actuating device. This is disadvantageous for the manufacture as well as the maintenance and repair.

A further disadvantage is that in the case of locking devices according to the prior art, the locking means necessary for the locking often protrude inwards into the door opening.

For example, bolts are known, into which a rotary latch, which is arranged on the door leaf, moves. These protruding locking means represent a risk of injury for passengers and are often also dirty, whereby clothing of passengers can be affected.

SUMMARY

The disclosure is based on proposing a locking means, which is an alternative for the prior art. Said locking means is to make it possible that one or several locking means, which lock the door leaf with the door portal, can be locked by means of a single actuating or drive device, respectively, even in the case of a curved door leaf. The risk of injury for passengers is to furthermore be as low as possible. The locking means is to be constructed easily and is to be capable of being produced cost-efficiently thereby.

This is solved according to the disclosure by providing means of a sealing and locking device with the features of the independent claim.

Advantageous further developments of the disclosure are described in the dependent claims.

The sealing and locking device according to the disclosure is thus formed with

- a sealing element, which
  - is arranged on at least one closing edge of the door portal and of the door leaf located opposite one another in the closed state of the door and which is fixed to the door portal,
  - has a locking unit, which cooperates with a locking means, which is arranged on the door leaf in a stationary manner,
  - internally has a hinge element, which runs along the closing edge of the door portal and which can be moved in a translatory manner in the longitudinal direction, and which connects the locking unit to a drive unit for the movement of the hinge element,
- and a locking unit, which
  - has a slider, which is firmly connected to the hinge element and can be moved by the latter in a translatory manner into a locked position, in which the slider blocks the locking means arranged on the door leaf and thus the door leaf, and an open position, in which the locking means arranged on the door leaf can be moved unhindered in an opening direction of the door leaf,
  - has an essentially closed housing, in which the slider is movably mounted and which has a hinge passage opening for the hinge element as well as a locking means opening for moving the locking means in and out.

The disclosure combines the two devices, which are already present in the case of vehicle doors, namely the sealing element and the locking unit, in a particularly advantageous manner.

The sealing element according to the disclosure includes, at least on one side of the door portal, a hinge element, which connects the locking unit, which is likewise arranged on the door portal, to a drive unit. The drive unit moves the hinge element in a translatory manner in the longitudinal direction along the side edge of the door portal. By means of the movement of the hinge element, a slider is likewise moved along the longitudinal direction of the door portal edge in the locking unit and can thus be moved from a locked position into an open position. In the locked position, the slider is located, in the opening direction of the door leaf, in front of a locking means, which is firmly arranged on the door leaf, for example a bolt or hook, which is held and blocked thereby. To open the door or to move the door leaf, respectively, the slider is disengaged from the locking means with the help of drive unit.

The slider is arranged in an essentially closed housing, whereby passengers cannot come into contact therewith. The hinge element is also guided within the sealing element, whereby a contact with passengers is likewise ruled out.

The sealing element is preferably arranged along a side edge of the door portal, preferably along a secondary closing edge. In a particularly advantageous embodiment variation, the sealing element forms a circumferential sealing frame for the door portal. The hinge element, which can be shifted in a translatory manner, is arranged in said sealing frame at least on one side, but it can also be provided on several sides.

The sealing element can preferably have a cover element, which covers the hinge element. The hinge element is thus then arranged between the vehicle-side door portal and the cover element.

The hinge element, which is preferably made of a thin sheet steel, can also follow a curved contour of a door portal and is thus also suitable for vehicles with curved vehicle walls or doors. It is also particularly advantageous that not only one, but also several locking units can be provided, which are each connected to one another via a hinge element and can thus be actuated simultaneously by means of a single drive unit. A single hinge element can also be provided, to which several locking units are fastened.

According to the disclosure, the locking unit has an essentially closed housing, into which the hinge element is guided through a hinge passage opening and is connected to the slider, which is mounted therein in a movable manner. On the inner side, the housing is embodied in such a way that the slider is guided in the longitudinal direction and lateral movements against it are ruled out.

In a particularly advantageous embodiment variation, the housing of the locking unit partially protrudes inwards with a door leaf contact region into the opening of the door portal. When the door leaf is closed, it comes into contact with the door leaf contact region and abuts thereon.

In the protruding door leaf contact region, the housing has the locking means opening for receiving the locking means arranged on the door leaf. When the door leaf is thus moved from the open position into the closed position, the locking means, preferably embodied as locking hook, moves into the locking means opening of the housing. The slider arranged in the housing subsequently locks the locking means in the housing by means of its longitudinal movement.

In its edge region, the slider, which is preferably embodied in an essentially rectangular manner, has a recess, which can be brought into alignment with the locking means opening. If the receptacle is aligned with the locking means opening, the locking means or the locking hook, respectively, can be guided through the locking means opening and the receptacle. On the slider, the receptacle is preferably followed by an inlet wedge, which is moved against the locking means and can be brought into a locked end position. The door leaf is thus pushed in the direction of the sealing element, thus in the direction of the door portal, which ensures a satisfactory sealing.

The slider preferably comprises a slidable material, preferably plastic. It has a very low friction coefficient, so that a good sliding capacity is ensured. The inlet wedge, in contrast, can be made of a low-wear or resistant material, for example of steel, in order to ensure a permanent and reliable functioning of the locking device.

The housing of the locking unit is connected to the door portal via suitable connecting means, preferably screwed thereto. The slider is connected, in turn, to the hinge element, a screw-connection also lends itself for this. However, any other suitable type of connection is also conceivable.

The locking means arranged on the door portal is preferably embodied in a hook-shaped manner as locking hook, as described above, so that the slider can be inserted between the door leaf and the protruding locking hook.

In the open as well as in the closed state of the door or of the door leaf, no further elements protrude into the interior of the vehicle, except for the door leaf contract region, whereby a risk of injury or soiling for passengers is largely ruled out.

BRIEF DESCRIPTION OF THE DRAWINGS

The disclosure will be described in more detail on the basis of the following figures. They show a preferred embodiment variation of the disclosure, other shapes and dimensions are also conceivable. It can in particular also be advantageous when the sealing and locking device according to the disclosure are arranged on the door leaf and the corresponding locking means on the door portal, in contrast.

DETAILED DESCRIPTION OF THE DRAWINGS

Figure 1:
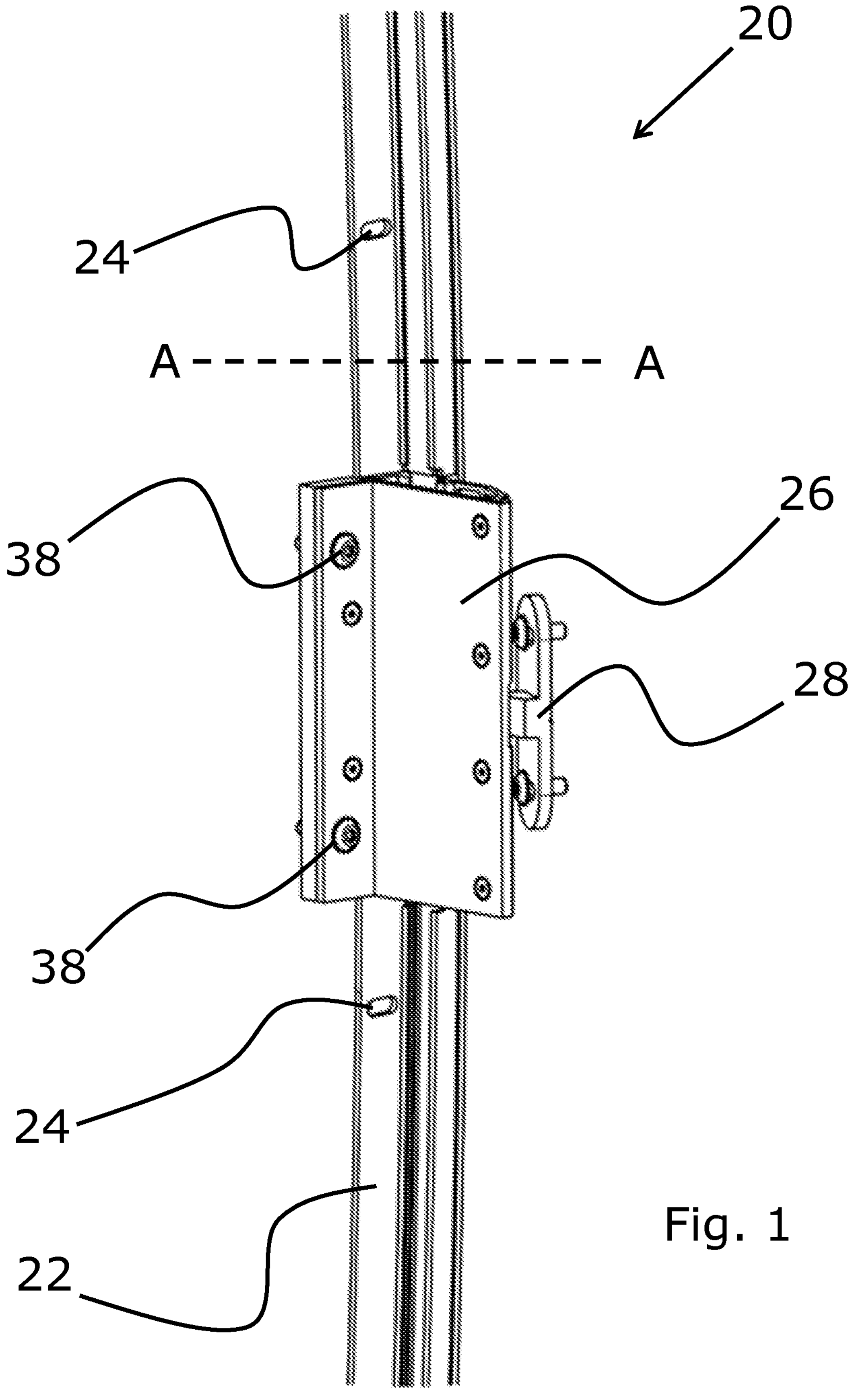
FIG. 1: shows a section of a sealing and locking device according to the disclosure comprising a sealing element and a locking unit.

FIG. 1 shows a sealing and locking device 20 for doors of public transport vehicles 19 (shown in FIG. 6) according to the disclosure. A sealing element 22 is shown, which can be fastened to a door portal 21, shown in FIG. 5, via the bores 24. The sealing and locking device 20 furthermore has a locking unit 26, which is integrated into the sealing element 22. The locking unit 26 cooperates with a locking means 28, which is arranged in a stationary manner on a door leaf 23.

Figure 2:
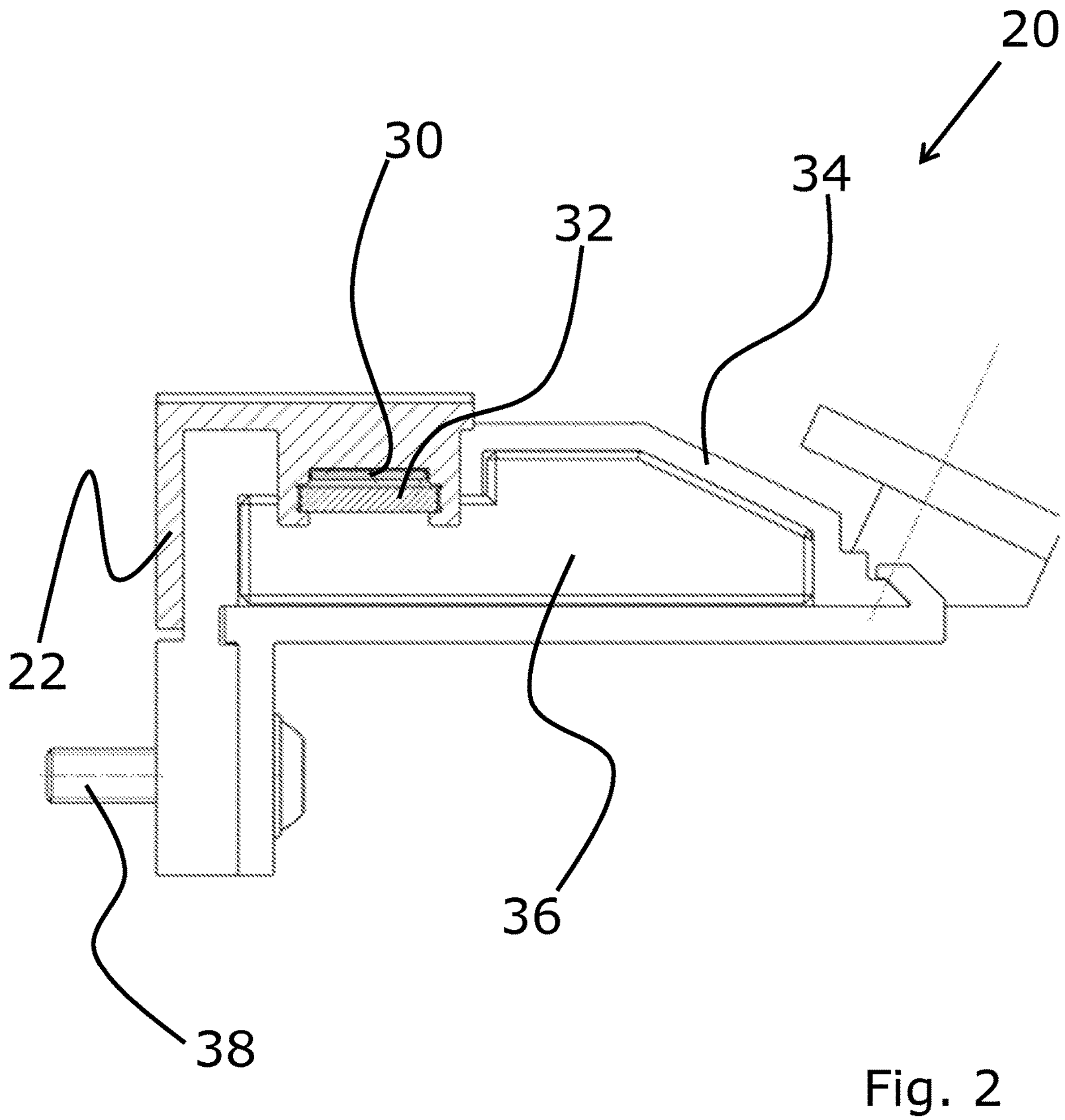
FIG. 2: shows the sealing device according to the disclosure in the section A-A in FIG. 1, FIG. 3: shows a partially open locking unit in the open position.

FIG. 2 shows a section through the sealing frame 1 along the section line A-A in FIG. 1. A hinge element 30 is mounted therein in a translatory manner, which preferably comprises thin sheet steel in order to be able to follow different vehicle contours. A cover element 32 is inserted into the sealing element 22 to cover and guide the hinge element 30.

The locking unit 26 has a housing 34, in which a slider 36 is arranged, which can be shifted in a translatory manner via the hinge element 30, which is driven by means of a non-illustrated drive unit. The housing 34 is connected to the door portal 21 via screws 38.

Figure 3:
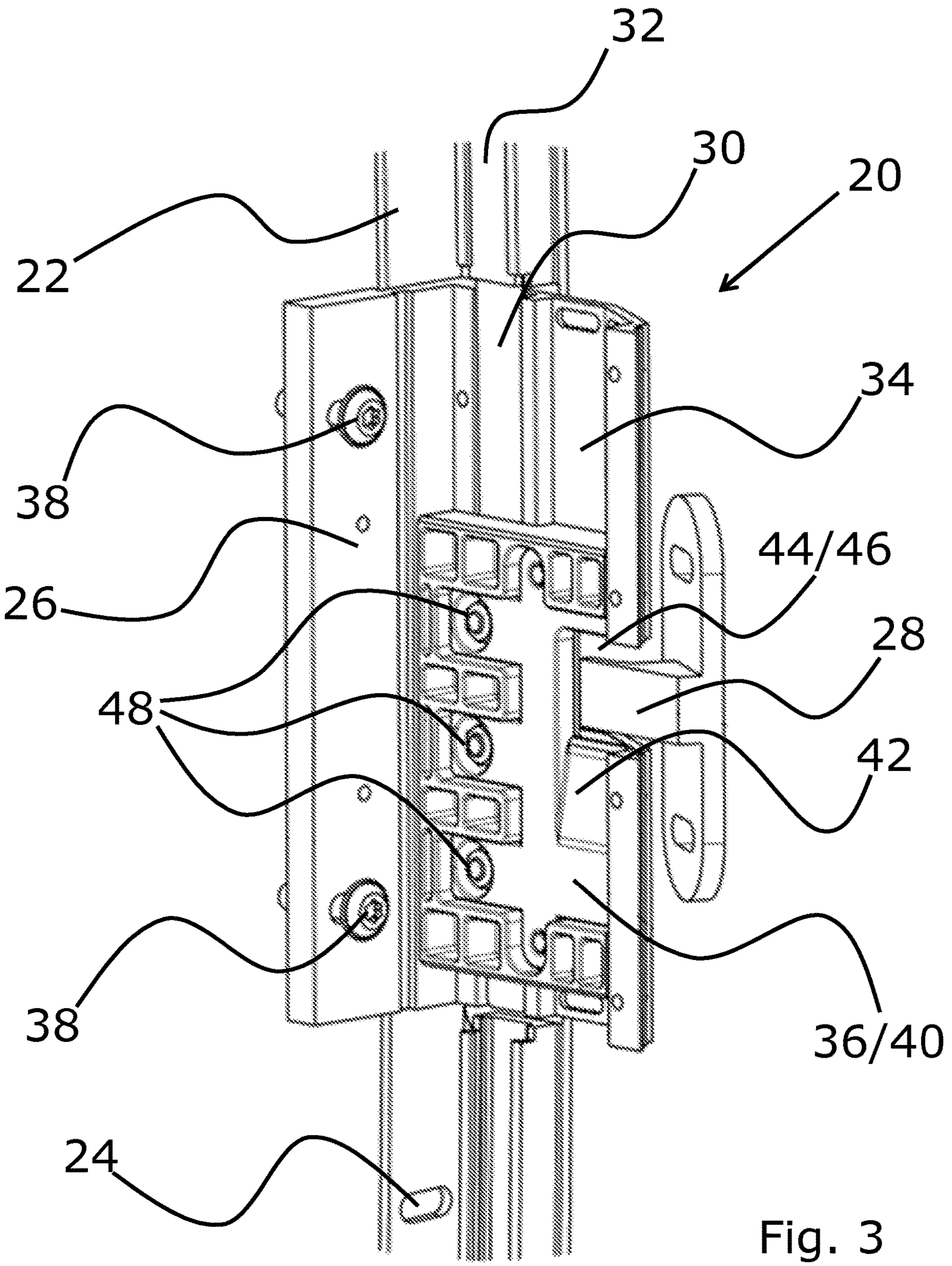

FIG. 3 shows the locking unit 26 in the open state. The slider 36, which can be shifted in a translatory manner, can be seen in the housing 34. In the shown exemplary embodiment, the slider 36 comprises a sliding element 40, into which an inlet wedge 42 is integrated. The inlet wedge 42 follows a recess 44, which is aligned with a locking means opening 46 in the housing 34 in the shown open position, so that the locking means 28 can be inserted into the housing 34. In the shown position, the locking means 28 is not engaged with the slider 36, the door can thus move into an open position.

In the shown exemplary embodiment, the slider 36 is connected to the hinge element 30 via screw-connections 48. The translatory shifting of the hinge element 30 and thus of the slider takes place via a non-illustrated connection to the door drive or via an electrical, hydraulic or pneumatic actuator.

Figure 4:
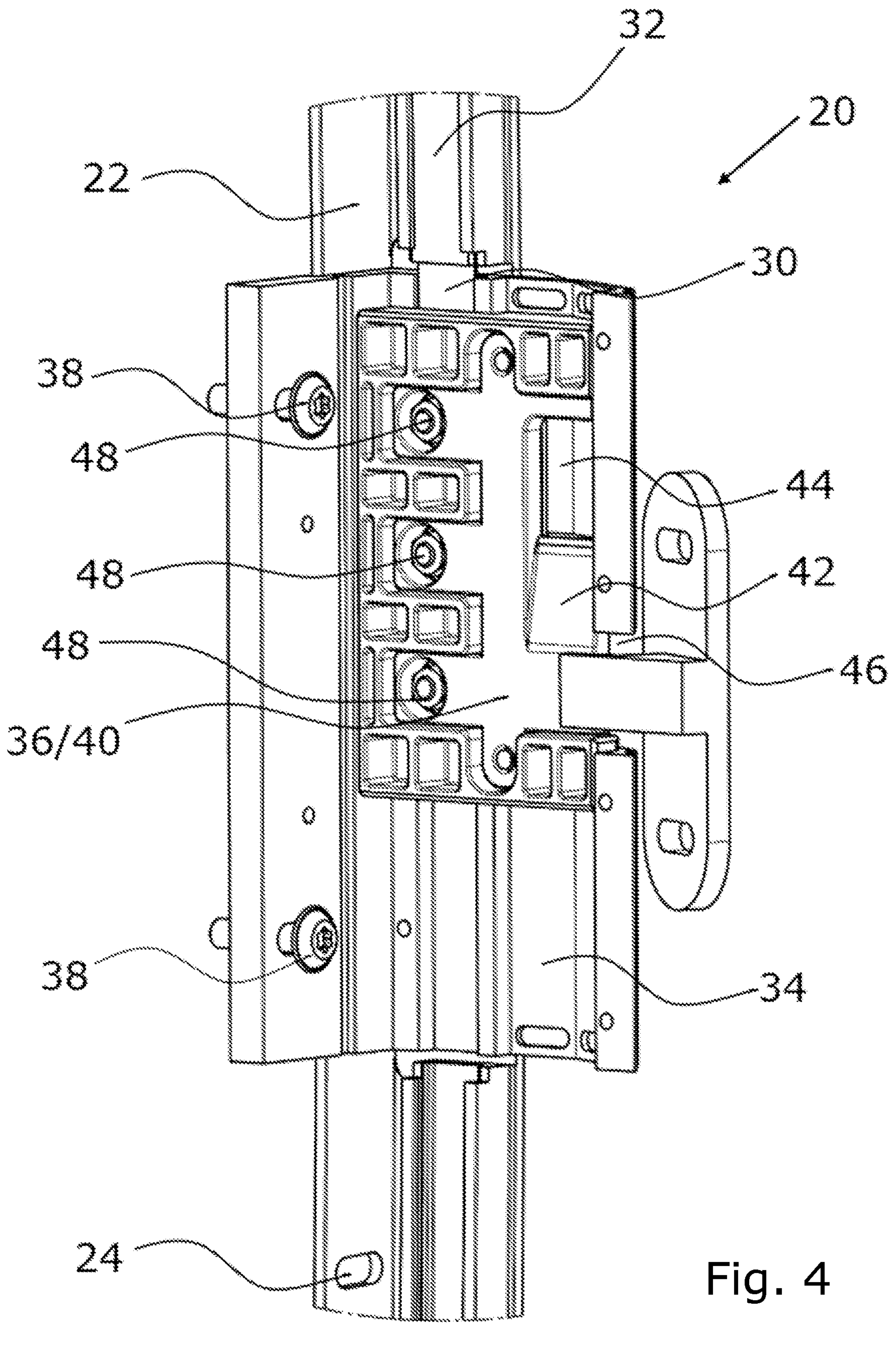
FIG. 4: shows the partially open locking unit from FIG. 3 in the locked position.

FIG. 4 shows the locked position of the locking unit 26. After a movement along the longitudinal axis of the sealing element 22, the slider 36 is engaged with the locking means 28 of the door leaf 23. Due to the fact that, in the shown exemplary embodiment, the locking means is embodied as locking hook, the slider 36 is located between the locking hook and the door leaf 23 and thus blocks the opening of the door leaf 23 in the opening direction.

Figure 5:
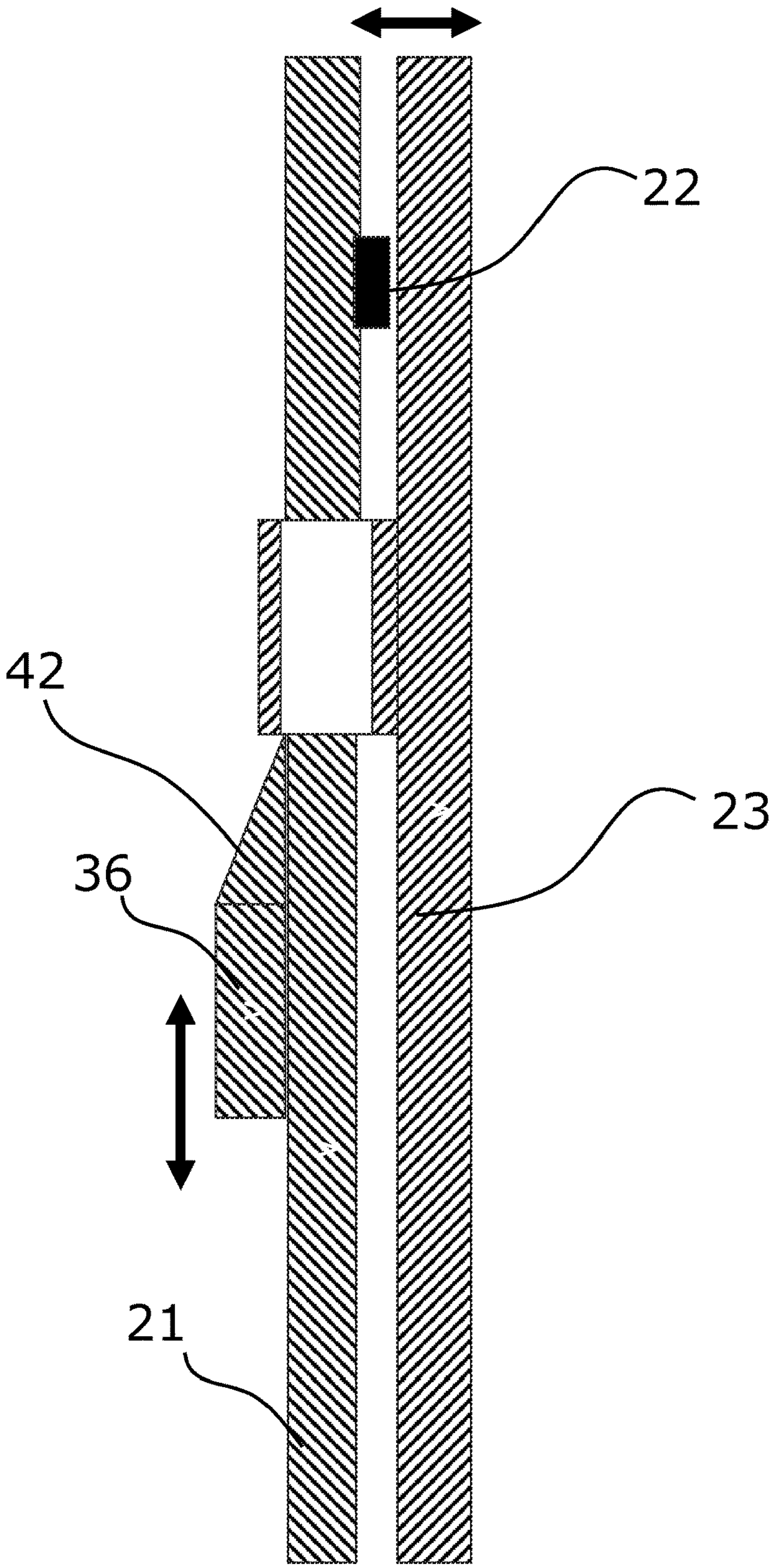
FIG. 5: shows the sealing element and respective movement according to the disclosure.
Figure 6:
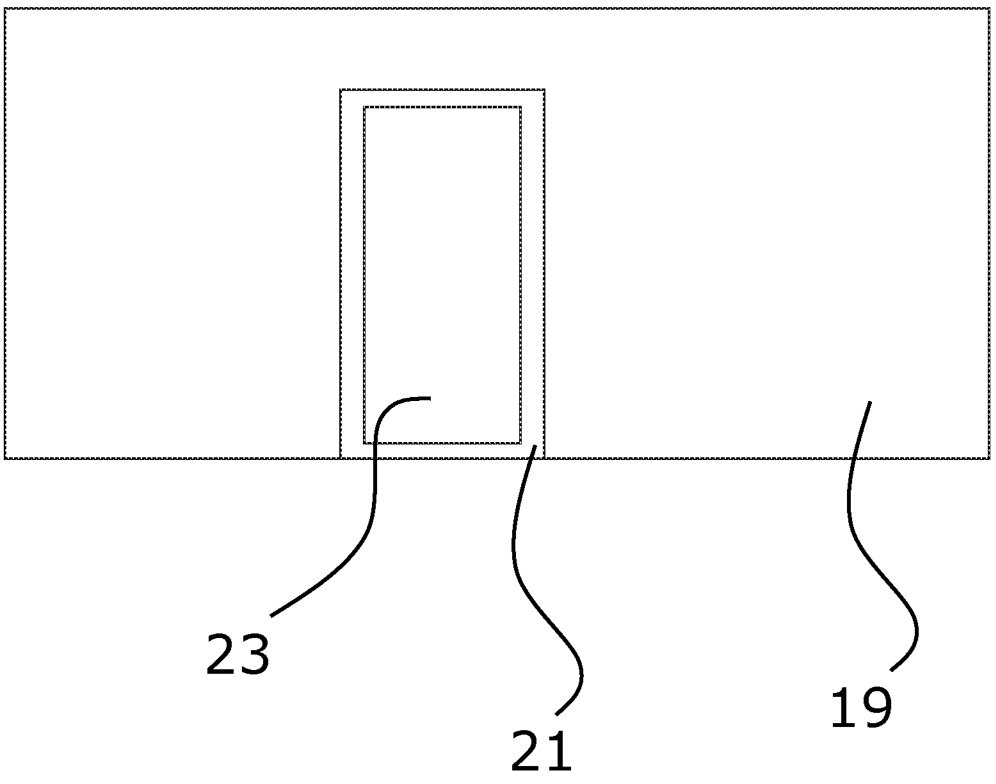
FIG. 6: shows the door portal and door leaf of a public transport vehicle according to the disclosure.

FIG. 5 shows the inlet wedge 42 next to or following the recess 44, respectively, effect a pushing of the door leaf 23 against the door portal 21 and thus against the sealing element 22, in response to the movement thereof between the locking hooks and the door leaf 23, whereby an increased sealing effect is attained.

The invention claimed is:

1. A sealing and locking device for doors of public transport vehicles, which have at least one door leaf arranged in a door portal, comprising a sealing element, which is arranged on at least one closing edge of the door portal and of the door leaf located opposite one another in the closed state of the door and which is fixed to a door portal, has a locking unit, which cooperates with a locking means, which is arranged on the door leaf in a stationary manner, internally has a hinge element, which runs along the closing edge of the door portal and which can be moved in a translatory manner in a longitudinal direction, and which connects the locking unit to a drive unit for the movement of the hinge element, the locking unit having a slider, which is firmly connected to the hinge element and can be moved by the latter in a translatory manner into a locked position, in which the slider blocks the locking means arranged on the door leaf and thus the door leaf, and an open position, in which the locking means arranged on the door leaf can be moved unhindered in an opening direction of the door leaf, a housing, in which the slider is movably mounted and which has a hinge passage opening for the hinge element as well as a locking means opening configured to move the locking means of the locking unit in and out.

2. The sealing and locking device according to claim 1, wherein guide means configured to guide the slider are provided in the housing.

3. The sealing and locking device according to claim 1, wherein the locking means is embodied as a locking hook and the slider has an inlet wedge, which can be moved in front of the locking hook arranged in the housing in front of the locking hook in response to the movement from the open position into the locked position in the opening direction of the door leaf.

4. The sealing and locking device according to claim 3, wherein the slider has a rectangular basic form comprising a recess arranged on one side, wherein the recess can be aligned with the locking means opening.

5. The sealing and locking device according to claim 4, wherein the inlet wedge follows the recess and can be brought behind the locking means during the movement of the slider from the open position into the locked position in the opening direction of the door leaf.

6. The sealing and locking device according to claim 5, wherein the inlet wedge effects a pressing force of the door leaf against the sealing element during the movement of the slider from the open position into the locked position.

7. The sealing and locking device according to claim 5, wherein the slider is formed from a slidable material with low friction coefficient and the inlet wedge is formed from a material, which has a higher wear-resistance than the material of the slider.

8. The sealing and locking device according to claim 1, wherein the housing has a door leaf contact region, which protrudes laterally into a door opening at least partially and has the locking means opening for receiving the locking means.

9. The sealing and locking device according to claim 1, wherein a second locking unit is provided, wherein the first locking unit and the second locking unit are connected to one another via the hinge element.

10. The sealing and locking device according to claim 1, wherein the hinge element is formed by a sheet steel.

11. The sealing and locking device according to claim 1, wherein the sealing element has a cover element, which covers and guides the hinge element in the sealing element.

* * * * *